United States Patent
Kimata et al.

(10) Patent No.: US 7,408,910 B2
(45) Date of Patent: Aug. 5, 2008

(54) NETWORK, PRIVATE BRANCH EXCHANGE, WIRELESS LAN TERMINAL, AND MULTIPROTOCOL COMMUNICATION TERMINAL CONTROL METHOD THEREFOR

(75) Inventors: Shinobu Kimata, Tokyo (JP); Yoshio Itagaki, Tokyo (JP)

(73) Assignee: NEC Corporation, Tokyo (JP)

( * ) Notice: Subject to any disclaimer, the term of this patent is extended or adjusted under 35 U.S.C. 154(b) by 679 days.

(21) Appl. No.: 10/968,152

(22) Filed: Oct. 20, 2004

(65) Prior Publication Data

US 2005/0083923 A1    Apr. 21, 2005

(30) Foreign Application Priority Data

Oct. 21, 2003   (JP)   ............... 2003-360131

(51) Int. Cl.
    *H04Q 7/24*   (2006.01)
(52) U.S. Cl. ...................... 370/338; 370/352
(58) Field of Classification Search ................. None
    See application file for complete search history.

(56) References Cited

U.S. PATENT DOCUMENTS

| | | | | |
|---|---|---|---|---|
| 6,330,244 B1* | 12/2001 | Swartz et al. | ............... | 370/401 |
| 6,937,699 B1* | 8/2005 | Schuster et al. | ............ | 379/67.1 |
| 7,177,661 B2* | 2/2007 | Shpak | ......................... | 455/524 |
| 7,180,984 B1* | 2/2007 | Samarasinghe | .......... | 379/88.13 |
| 7,266,591 B1* | 9/2007 | Johnston | ..................... | 709/219 |
| 2003/0134638 A1* | 7/2003 | Sundar et al. | ............... | 455/435 |
| 2003/0200260 A1 | 10/2003 | Donovan et al. | | |
| 2004/0205209 A1* | 10/2004 | Wengrovitz et al. | ......... | 709/230 |
| 2004/0258049 A1* | 12/2004 | Sylvain et al. | .............. | 370/352 |

FOREIGN PATENT DOCUMENTS

| | | | |
|---|---|---|---|
| EP | 1 311 103 A3 | | 5/2003 |
| JP | 11-341532 | | 12/1999 |
| WO | WO 02/103951 A2 | | 12/2002 |
| WO | WO 02/103951 A3 | | 12/2002 |

OTHER PUBLICATIONS

Amir Zmora Radvision, "B2BUA: Enabling Class 5 Capabilities in SIP Designs", Sep. 9. 2003, pp. 1-5, www.commsdesign.com.
J. Rosenberg et al., "SIP: Session Initiation Protocol", Standards Track, Jun. 2002, pp. 8-34.

* cited by examiner

*Primary Examiner*—Chau T. Nguyen
*Assistant Examiner*—Eunsook Choi
(74) *Attorney, Agent, or Firm*—Foley & Lardner LLP (57) ABSTRACT

A standard-SIP (session initiation protocol) protocol control module and an expanded sip protocol control module are provided so as to correspond to respective Sip protocol corresponding terminals, such as wireless LAN terminals compliant with the SIP. A signal (a request) from each Sip protocol corresponding terminal is converted into a signal according to a protocol of an IP-PBX and is sent to a PBX basic-connection-processing providing module. A signal (a response for the request or a request to the Sip protocol corresponding terminal) from the PBX basic-connection-processing providing module is converted into an Sip protocol signal and is sent to the Sip protocol corresponding terminal. A location-information management module collects a basic service set identifier (BSSID) from each wireless LAN network and stores the BSSID information into a database.

24 Claims, 9 Drawing Sheets

NETWORK, PRIVATE BRANCH EXCHANGE, WIRELESS LAN TERMINAL, AND MULTIPROTOCOL COMMUNICATION TERMINAL CONTROL METHOD THEREFOR

BACKGROUND OF THE INVENTION

1. Field of the Invention

The present invention relates to networks, private branch exchanges (PBXs), wireless local-area-network (LAN) terminals, and multiprotocol communication-terminal control methods therefor, and, more particularly, to a terminal connected to a network including an internet-protocol (IP) private branch exchange.

2. Description of the Related Art

This type of network has heretofore been constituted by connection of a private branch exchange to a fixed phone terminal, a radio terminal such as a personal handy-phone system (PHS), a voice over Internet protocol (VoIP) terminal or the like via a local area network (LAN).

As the VoIP terminal, in addition to an IP phone terminal and an Internet phone terminal, there is a session initiation protocol terminal. The SIP is a communication protocol for use in starting or ending multimedia communication such as sound communication (fixed phone, cellular phone, etc.), video communication such as television phone, chat (conversation by characters) and the like in an environment of an IP network using data having a form referred to as an IP packet.

In the IP network, in general, connection-less type communication is performed without confirming connection to a target as in electronic mails. On the other hand, in the fixed phone, in general, connection type communication is performed while confirming the connection with the target. The SIP realizes the connection type communication in the IP network.

The SIP basically comprises methods (operations) such as INVITE (session between users is established), ACK (acknowledgment), CANCEL (INVITE is ended during the establishment of the session), and BYE (the end of the session). The respective methods are exchanged as requests and responses to the requests between clients and servers to thereby establish or end the session.

Moreover, the SIP has characteristics that applications can be comparatively easily prepared. For example, when a new service is added to H.323 of ITU-T for use in the IP phone, an H.450.x protocol which defines the H.323 additional service is added, and all H.323 end points on the network and software of a gate keeper need to be updated. However, in the SIP, an SIP application server which provides the new service is added, and the corresponding application is added. Then, the new service is usable.

Japanese Unexamined Patent Publication (JP-A) H11-341532A and an article entitled "SIP: Session Initiation Protocol" (RFC (Request for Comments) 3261, June 2002, pp. 8-34) disclose the earlier techniques described above.

In the known network described above, wireless terminals, such as PHS terminals, can connect to a private branch exchange via an access point included in a wireless LAN, but has a problem. Specifically, even when an SIP-compliant wireless terminal is covered by services of the private branch network, only limited services (e.g., a transfer service, three-way calling service, and call waiting service) defined by IETF (Internet Engineering Task Force) can be offered for communication between the wireless terminal and the SIP terminal.

That is, even when the wireless terminal and the SIP terminal are connected to the network, there is a problem in that a wide range of services (e.g., a call-back service, extension-call interruption service, third-party control service) are not available for communication between the wireless terminal and the SIP terminal.

Further, since the wireless terminal is connected to the private branch exchange via an access point, the wireless terminal can connect to the private branch exchange anytime and anywhere as long as an access point exists at a location to which the user of the terminal wireless moves. This makes it difficult to keep a track of the current location of the user.

SUMMARY OF THE INVENTION

In order to overcome the above-described problems, an object of the present invention is to provide a network, a personal branch exchange, a wireless LAN terminal, and a multiprotocol communication-terminal control method therefor, in which the wireless LAN terminal can receive a wide range of services offered by the private branch exchange and the location information of the wireless LAN terminal can be managed.

One aspect of the present invention provides a network that includes at least one SIP (Session Initiation Protocol) terminal, a private branch exchange for performing call connection processing between terminals, and a wireless LAN. The SIP terminal performs communication based on an SIP that implements connection-oriented communication in which communication is performed upon confirmation of a connection with another terminal in an IP (Internet Protocol) network. The LAN includes an access point that is connected to the private branch exchange through a transmission path, and at least one wireless LAN terminal that belongs to the access point and notifies of unique identifier information of the access point. The private branch exchange includes at least one Sip protocol control module obtained by modularizing processing of the SIP through use of a scheme of a B2BUA (back-to-back user agent) that acts as a proxy user agent and incorporated as one component. The private branch exchange further includes a location-information management module, incorporated as one component, for managing the unique identifier information of which the wireless LAN terminal notifies.

Another aspect of the present invention provides a private branch exchange for performing call connection processing between terminals. The private branch exchange includes at least one Sip protocol control module obtained by modularizing processing of an SIP through use of a scheme of a B2BUA that acts as a proxy user agent. The SIP implements connection-oriented communication in which communication is performed upon confirmation of a connection with another terminal in an IP network. The private branch exchange further includes a location-information management module, incorporated as one component, for managing unique identifier information of an access point included in a wireless LAN and connected to the personal branch exchange through a transmission path. The wireless LAN includes at least one wireless LAN terminal that belongs to the access point and that notifies of the unique identifier information.

Another aspect of the present invention provides a wireless LAN terminal included in a wireless LAN having an access point to which the wireless LAN terminal belongs. The wireless LAN is provided in a network that includes, at least, a private branch exchange for performing call connection processing between terminals and at least one session-initiation-protocol (SIP) terminal for performing communication based on a session initiation protocol that implements connection-oriented communication in which communication is performed upon confirmation of a connection with another terminal in an internet protocol (IP) network. The access point is connected to the private branch exchange through a transmission path. The private branch exchange includes a location-information management module, incorporated as one component, for managing unique identifier information of the access point. The private branch exchange further includes at lease one session-initiation-protocol control module obtained by modularizing processing of the session initiation protocol through use of a scheme of a back-to-back user agent (B2BUA) that acts as a proxy user agent and incorporated as one component. The wireless LAN terminal includes a notifying unit for notifying the location-information management module of the unique identifier information of the access point via the session-initiation-protocol control module.

Still another aspect of the present invention provides a method for controlling at least one multiprotocol communication terminal in a network that includes, at least, at least one SIP terminal for performing communication based on an SIP that implements connection-oriented communication in which communication is performed upon confirmation of a connection with another terminal in an IP network, a private branch exchange for performing call connection processing between terminals, and a wireless LAN including an access point that is connected to the private branch exchange through a transmission path and at least one wireless LAN terminal that belongs to the access point and notifies of unique identifier information of the access point. The method includes a step of causing at least one Sip protocol control module to perform processing of the SIP. The Sip protocol control module is obtained by modularization through use of a scheme of a B2BUA that acts as a proxy user agent and is incorporated as one component of the private branch exchange. The method further includes a step of causing a location-information management module to manage the unique identifier information of which the wireless LAN terminal notifies. The location-information management module is incorporated as one component of the private branch exchange.

That is, the private branch exchange (i.e., the IP-PBX) includes, as one component, a module that is obtained by modularizing processing of the SIP through use of a scheme of a B2BUA. Thus, the private branch exchange allows protocol modules to provide interconnection between the wireless LAN terminals that are compliant with the SIP and other extensions connected to the private branch exchange. Further, this arrangement can offer a wide range of additional services of the personal branch exchange to the wireless LAN terminals.

Typically, the access point included in a wireless LAN in a network notifies a wireless LAN terminal that belongs to the access point about information called a BSSID (basic service set identifier), which is generally the MAC (media access control) address of an access point and is different for each access point. By detecting the BSSID information, the wireless LAN terminal can recognize a connectable access point.

In the network according to the present invention, each wireless LAN terminal has a function for notifying the private branch exchange about the BSSID received from the access point. This function is not available with known SIP terminals.

Each wireless LAN terminal notifies of the BSSID information, for registration in the private branch exchange and/or for making/receiving a call. The private branch exchange stores the notified BSSID into the database of the private branch exchange, for each wireless LAN terminal.

Since each wireless LAN terminal can freely move in the wireless LAN, an access point to which the terminal belongs changes due to the movement. At a location to which the terminal moves, when the wireless LAN terminals performs a registration operation or an outbound/inbound call operation, the wireless LAN terminal notifies the private branch exchange of BSSID information that is different from the BSSID information stored in the database. Thus, the private branch exchange updates content in the database 8 which corresponds to the wireless LAN terminal.

In the network according to the present invention, the use of BSSID information stored in the database of private branch exchange can provide a service in which a uses location is necessary, for example, an emergency telephone service in which making a call to a specific number is possible in an emergency to inform of the state of the emergency.

Additionally, in the network according to the present invention, a wireless LAN terminal that does not have a function for notifying of a BSSID may be used. In such a case, by using the access point that covers the wireless LAN terminal and that can work with the private branch exchange, the wireless LAN terminal can notify the private branch exchange about information of the wireless LAN terminal and the BSSID of the access point. This arrangement, therefore, can provide a service in which location information is necessary, such as an emergency telephone service.

The present invention can provide a wireless LAN terminal with a wide range of services offered by a private branch exchange, and other features and advantages of the present invention will be apparent from configurations and operations described below.

DESCRIPTION OF THE PREFERRED EMBODIMENTS

Figure 1:
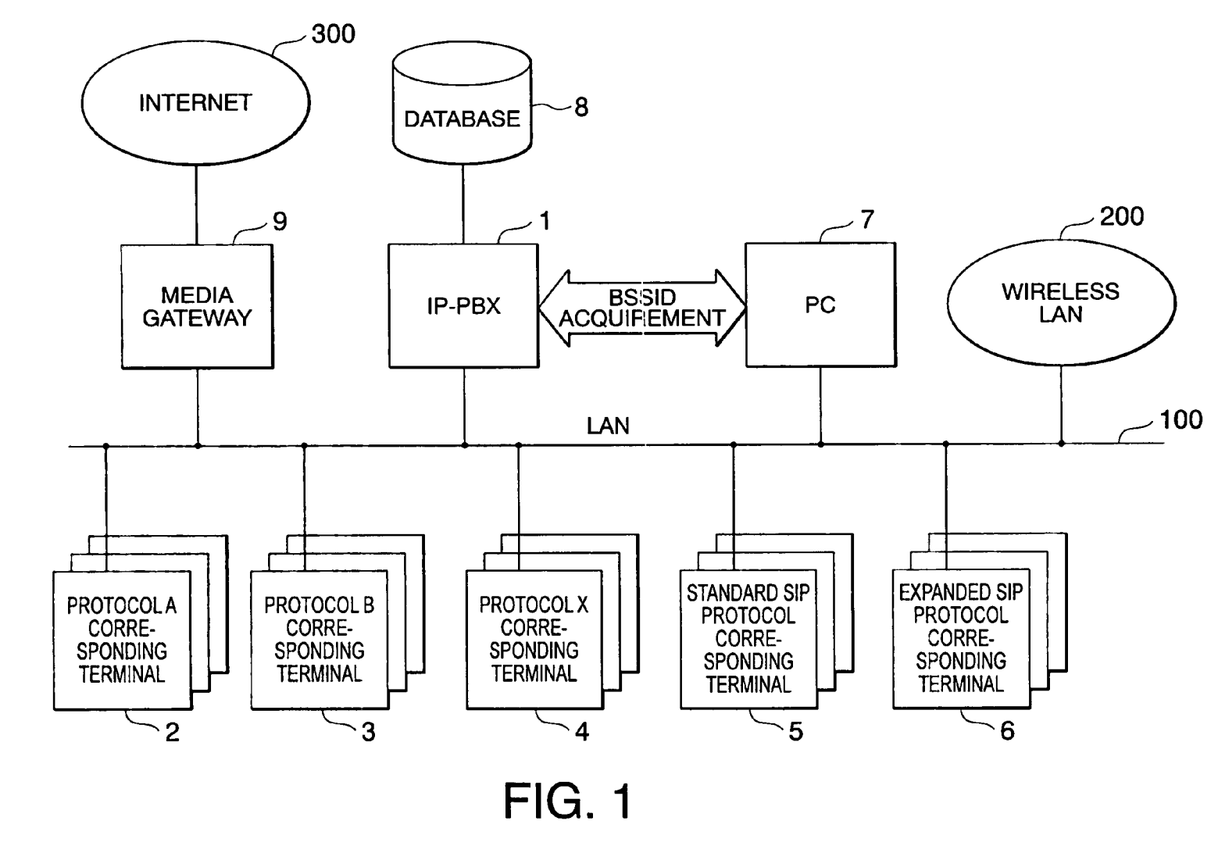
FIG. 1 is a block diagram of the configuration of a network according to a first embodiment of the present invention.

Next, embodiments of the present invention will be described with reference to the drawings. FIG. 1 is a block diagram showing a constitution of a network according to one embodiment of the present invention. In FIG. 1, in the constitution of the network according to one embodiment of the present invention, an Internet protocol private branch exchange (IP-PBX: IP corresponding private branch exchange) 1, a protocol A corresponding terminal 2, a protocol B corresponding terminal 3, a protocol X corresponding terminal 4, a standard session initiation protocol (SIP) protocol corresponding terminal 5, an expanded SIP protocol corresponding terminal 6, a PC (personal computer) 7, a database 8, a media gateway 9, and a radio LAN 200 are connected to one another via a local area network (LAN) 100. The constitution is connected to Internet 100 via the media gate way 9 and the IP-PBX is connected to the database 8.

Figure 2:
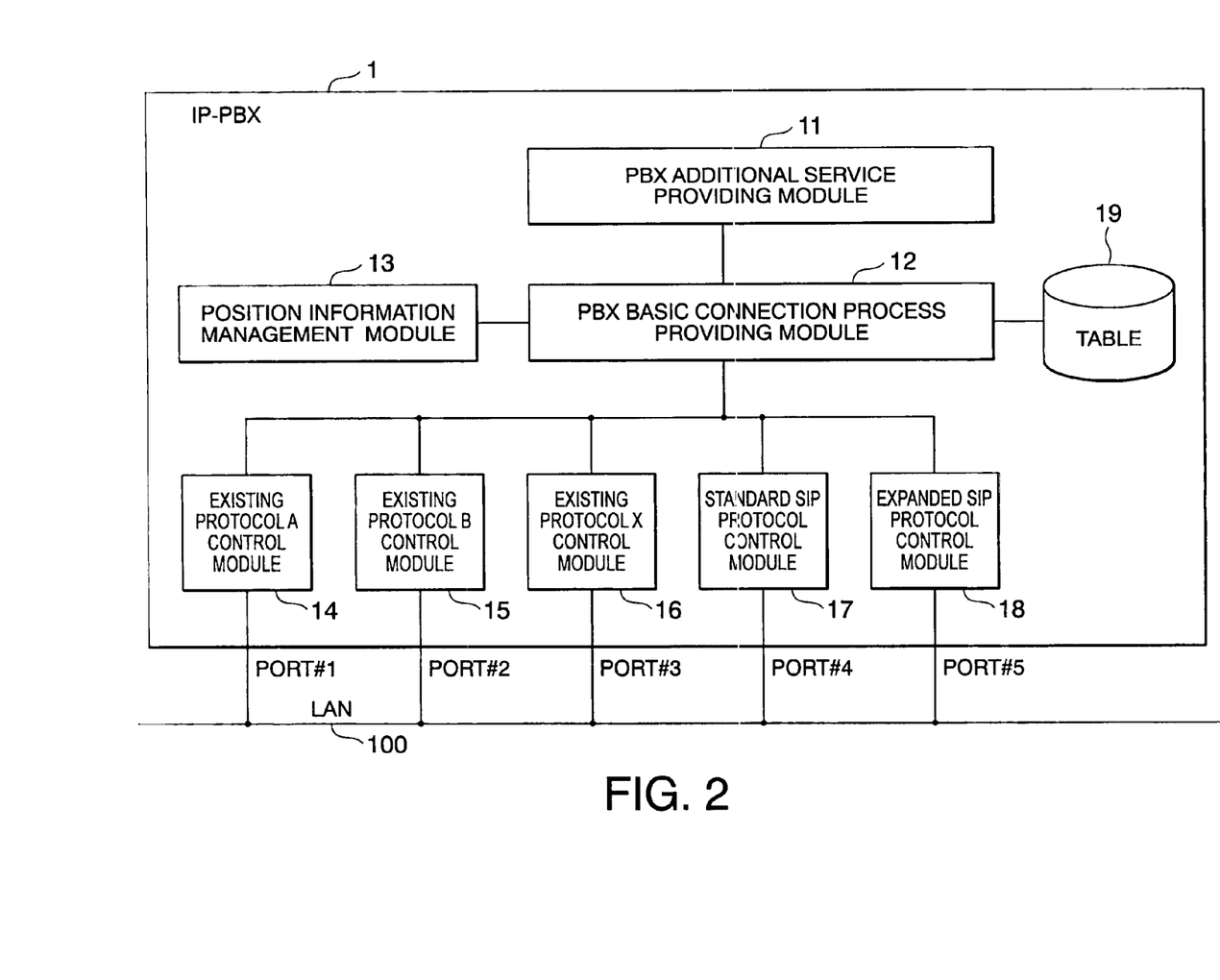
FIG. 2 is a block diagram of the configuration of the IP PBX shown in FIG.

FIG. 2 is a block diagram showing a constitution of the IP-PBX 1 of FIG. 1. In FIG. 2, the IP-PBX 1 comprises: a PBX additional service providing module 11; a PBX basic connection process providing module 12; a position information management module 13; an existing protocol A control module 14; an existing protocol B control module 15; an existing protocol X control module 16; a standard SIP protocol control module 17; an expanded SIP protocol control module 18; and a table 19.

The standard SIP protocol control module 17 and the expanded SIP protocol control module 18 terminate an SIP system protocol, the process of the SIP is constituted into a module using a mechanism of a back to back user agent (B2BUA), and incorporated as one of component groups of the IP-PBX 1, and the module can be realized even by hardware or software. The IP-PBX 1 provides mutual connection, and additional services with respect to each protocol group constituted into the above-described module.

Here, the B2BUA is a logical entity (function) which processes a request (message) as a user agent server, when receiving SIP request (SIP message) from an SIP terminal of a transmitter. To determine an answer to the request from the SIP terminal of the transmitter, the B2BUA operates as a user agent client with respect to the SIP terminal of the transmitter, and produces the request to the SIP terminal of a transmission target, That is, in the B2BUA, a private user agent is combined with a public user agent, and the B2BUA operates as a user agent with respect to each network (terminal).

The PBX additional service providing module 11 provides additional services (e.g., call back service, extension interruption service, third party control service, etc.) to the protocol A corresponding terminal 2, the protocol B corresponding terminal 3, the protocol X corresponding terminal 4, the standard SIP protocol corresponding terminal 5, and the expanded SIP protocol corresponding terminal 6.

The PBX basic connection process providing module 12 provides a basic connection process, and mutual connection with respect to the protocol A corresponding terminal 2, the protocol B corresponding terminal 3, the protocol X corresponding terminal 4, the standard SIP protocol corresponding terminal 5, and the expanded SIP protocol corresponding terminal 6. The tone control module 13 performs a tone control process with respect to the protocol A corresponding terminal 2, the protocol B corresponding terminal 3, the protocol X corresponding terminal 4, the standard SIP protocol corresponding terminal 5, and the expanded SIP protocol corresponding terminal 6.

The position information management module 13 collects information called BSSID (Basic Service Set Identifier: it generally represents the MAC (Media Access Control) address of the access point) address from wireless LAN terminal which is included in the wireless LAN 200 and then record the collected BSSID information to the database 8.

The existing protocol A control module 14 is disposed for the protocol A corresponding terminal 2, and converts a signal from the protocol A corresponding terminal 2 into a signal of a protocol (hereinafter referred to as the PBX internal protocol) inside the IP-PBX 1, and transmits the signal to the PBX basic connection process providing module 12. Moreover, the control module converts a signal from the PBX basic connection process providing module 12 into a signal of a protocol A, and transmits the signal to the protocol A corresponding terminal 2.

The existing protocol B control module 15 is disposed for the protocol B corresponding terminal 3, and converts a signal from the protocol B corresponding terminal 3 into a signal of the PBX internal protocol, and transmits the signal to the PBX basic connection process providing module 12. Moreover, the control module converts a signal from the PBX basic connection process providing module 12 into a signal of a protocol B, and transmits the signal to the protocol B corresponding terminal 3.

The existing protocol X control module 16 is disposed for the protocol X corresponding terminal 4, and converts a signal from the protocol X corresponding terminal 4 into a signal of the PBX internal protocol, and transmits the signal to the PBX basic connection process providing module 12. Moreover, the control module converts a signal from the PBX basic connection process providing module 12 into a signal of a protocol X, and transmits the signal to the protocol X corresponding terminal 4.

The standard SIP protocol control module 17 is disposed for the standard SIP protocol corresponding terminal 5, and converts a signal from the standard SIP protocol corresponding terminal 5 into a signal of the PBX internal protocol, and transmits the signal to the PBX basic connection process providing module 12. Moreover, the control module converts a signal (response to the request, or request to the standard SIP protocol corresponding terminal 5) from the PBX basic connection process providing module 12 into a signal of a standard SIP protocol, and transmits the signal to the standard SIP protocol corresponding terminal 5.

The expanded SIP protocol control module 18 is disposed for the expanded SIP protocol corresponding terminal 6, and converts a signal (request) from the expanded SIP protocol corresponding terminal 6 into a signal of the PBX internal protocol, and transmits the signal to the PBX basic connection process providing module 12. Moreover, the control module converts a signal (a response to the request, or a request to the expanded SIP protocol corresponding terminal 6) from the PBX basic connection process providing module 12 into a signal of an expanded SIP protocol a, and transmits the signal to the expanded SIP protocol corresponding terminal 6.

Here, port number (ports #1 to #5) or IP address (local or global IP address) is assigned to each of the existing protocol A control module 14, existing protocol B control module 15, existing protocol X control module 16, standard SIP protocol control module 17, and expanded SIP protocol control module 18. In the table 19, the protocol of the corresponding terminal is held for each assigned port number or IP address. The PBX basic connection process providing module 12 refers to the table 19 to judge the protocol from the port number or the IP address.

Figure 3:
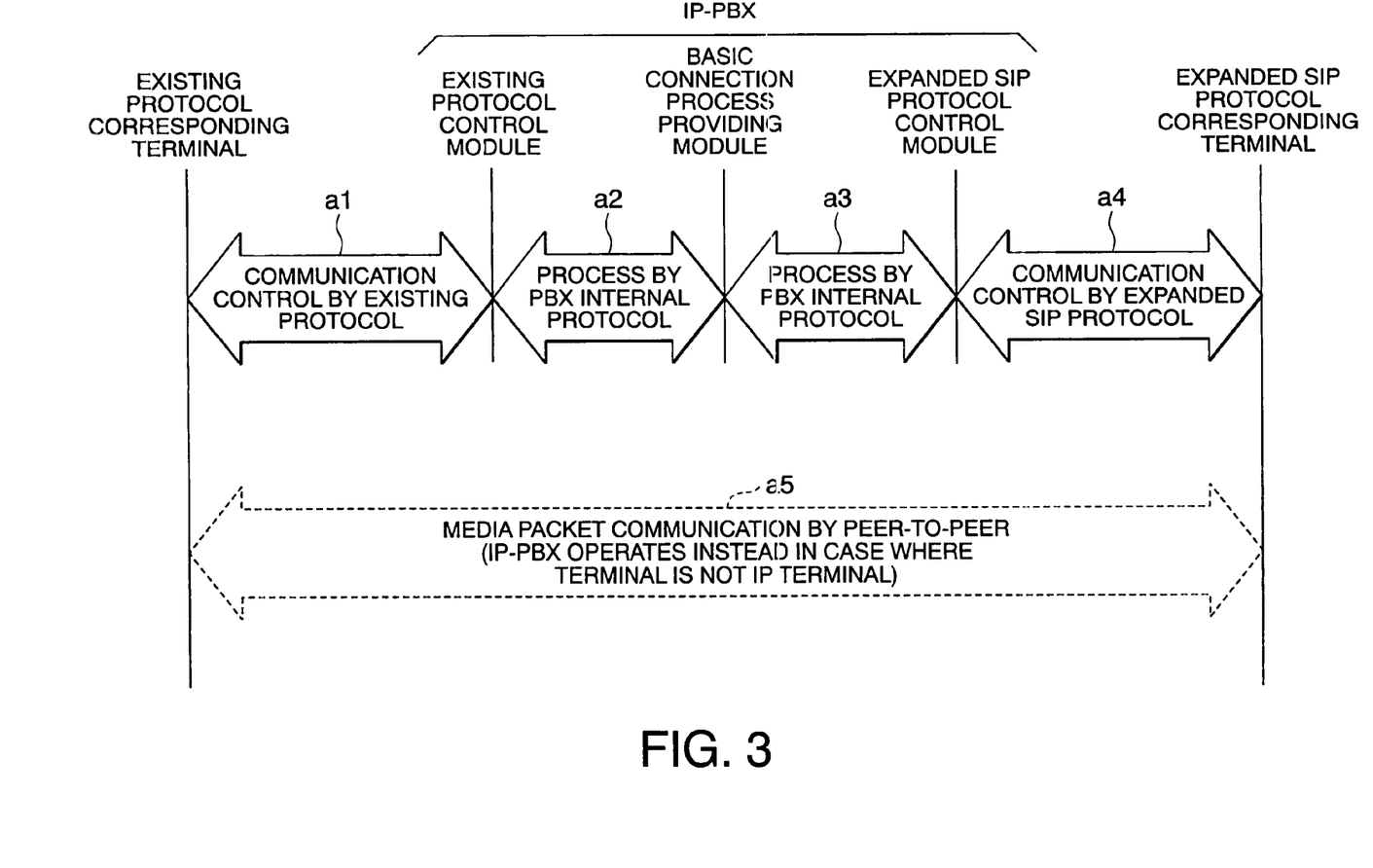
FIG. 3 is a sequence chart showing processing of the IP PBX shown in FIG. 1.
Figure 4:
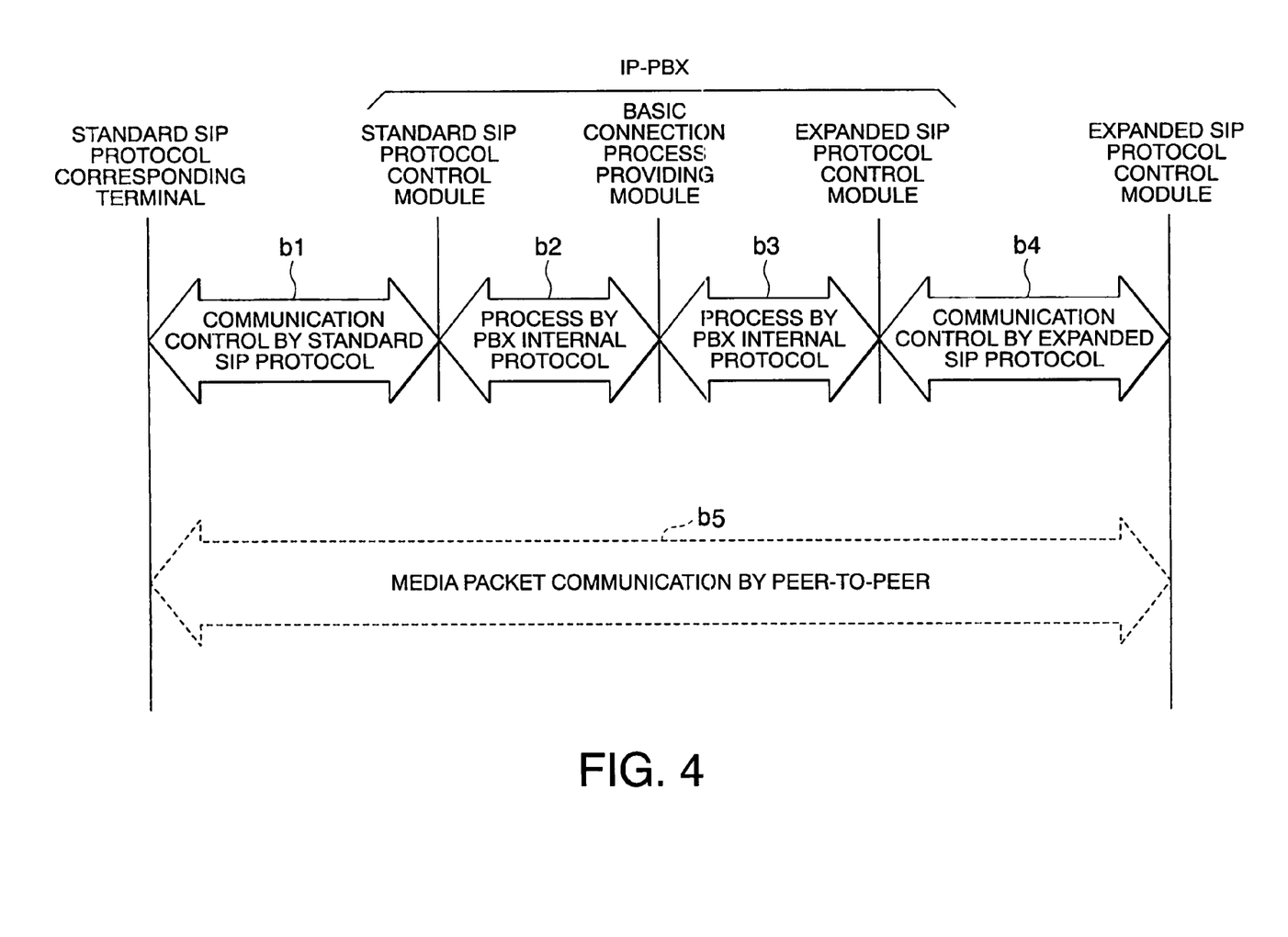
FIG. 4 is a sequence chart showing processing of the IP PBX shown in FIG. 1.

FIGS. 3 and 4 are sequence charts showing a process operation of the IP-PBX 1 of FIG. 1. The process operation of the IP-PBX 1 will be described with reference to FIGS. 1 to 4. These processes are realized by either hardware or software (program).

First, a process will be described in a case where the existing protocol corresponding terminal (the protocol A corresponding terminal 2, the protocol B corresponding terminal 3, the protocol X corresponding terminal 4 of FIG. 1) requests connection to the SIP system protocol corresponding terminal (the standard SIP protocol corresponding terminal 5, and the expanded SIP protocol corresponding terminal 6 of FIG. 1).

When the existing protocol corresponding terminal transmits a request for connection to the SIP system protocol corresponding terminal with respect to the IP-PBX 1, the existing protocol control module (the existing protocol A control module 14, existing protocol B control module 15, existing protocol X control module 16 of FIG. 2) of the IP-PBX 1 accepts the connection request from the existing protocol corresponding terminal in the communication control of the existing protocol (a1 if FIG. 3), converts the connection request of the existing protocol into the signal of the PBX internal protocol, and sends the signal to the PBX basic connection process providing module 12 (process by the PBX inner protocol) (a2 of FIG. 3).

The PBX basic connection process providing module 12 processes the connection request from the existing protocol corresponding terminal to transfer the request to the SIP system protocol control module (standard SIP protocol control module 17, expanded SIP protocol control module 18 of FIG. 2) (processing by the PBX internal protocol) (g3 of FIG. 3).

The SIP system protocol control module converts a signal from the PBX basic connection process providing module 12 into the connection request of the SIP system protocol, and transmits the connection request to the SIP protocol corresponding terminal in the communication control of the SIP system protocol (g4 of FIG. 3).

When the session between the existing protocol corresponding terminal and the SIP system protocol corresponding terminal is established by the above-described process, the media packet between the existing protocol corresponding terminal and the SIP system protocol corresponding terminal is communicated by peer-to-peer (a5 of FIG. 3). Additionally, when one of the terminals is not the IP terminal, the communication of the media packet is performed by the IP-PBX 1 instead.

It is to be noted that when the additional service of the IP-PBX 1 is utilized in the communication between the existing protocol corresponding terminal and the SIP protocol corresponding terminal, the request is transferred to the PBX additional service providing module 11 from the PBX basic connection process providing module 12 and processed.

Next, a process will be described in a case where the standard SIP protocol corresponding terminal 5 requests the connection with respect to the expanded SIP protocol corresponding terminal 6.

When the standard SIP protocol corresponding terminal 5 transmits the connection request to the expanded SIP protocol corresponding terminal 6, the standard SIP protocol control module 17 of the IP-PBX 1 accepts the connection request from the IP-PBX 1 accepts the connection request from the standard SIP protocol corresponding terminal 5 in the communication control of the standard SIP protocol (b1 of FIG. 4). The module converts the connection request of the standard SIP protocol into the signal of the PBX internal protocol, and sends the signal to the PBX basic connection process providing module 12 (processing by the PBX internal protocol) (b2 of FIG. 4).

The PBX basic connection process providing module 12 processes the connection request from the standard SIP protocol corresponding terminal 5, and transfers the request to the expanded SIP protocol control module 18 (processing by the PBX internal protocol) (b3 of FIG. 4).

The expanded SIP protocol control module 18 converts the signal from the PBX basic connection process providing module 12 into the connection request of the expanded SIP protocol, and transmits the connection request to the expanded SIP protocol corresponding terminal 6 in the expanded SIP protocol (b4 of FIG. 4).

When the session between the standard SIP protocol corresponding terminal 5 and the expanded SIP protocol corresponding terminal 6 is established by the above-described process, the media packet between the standard SIP protocol corresponding terminal 5 and the expanded SIP protocol corresponding terminal 6 is communicated by the peer-to-peer (b5 of FIG. 4).

Figure 5:
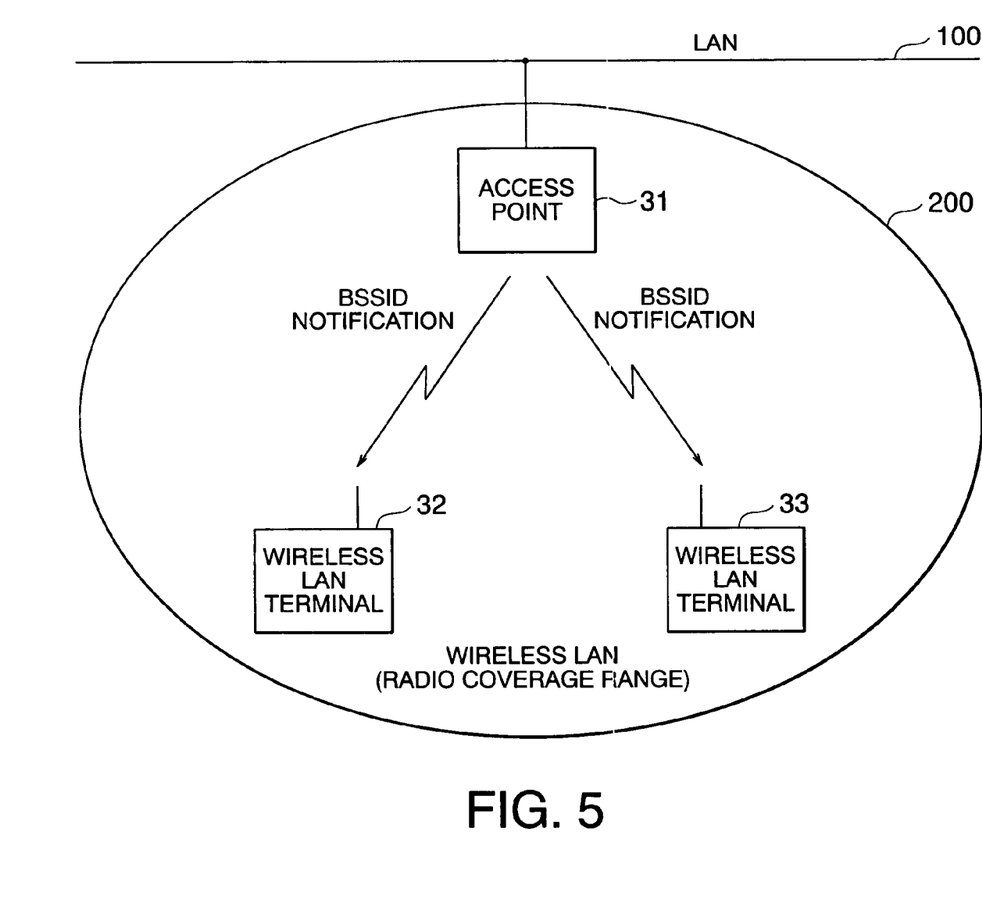
FIG. 5 is a block diagram of the wireless LAN shown in FIG. 1.

FIG. 5 is a block diagram of the configuration of the wireless LAN 200 shown in FIG. 1. Referring to FIG. 5, the wireless LAN 200 includes an access point 31 and wireless LAN terminals 32 and 33. The access point 31 is connected to the LAN 100 and the wireless LAN terminals 32 and 33 belong to the access point 31.

The access point 31 notifies the wireless LAN terminals 32 and 33 of information called a BSSID (basic service set identifier), which is typically the MAC (media access control) address of an access point and is different for each access point. By detecting the BSSID information, each of the wireless LAN terminals 32 and 33 can recognize the connectable access point 31.

Figure 6:
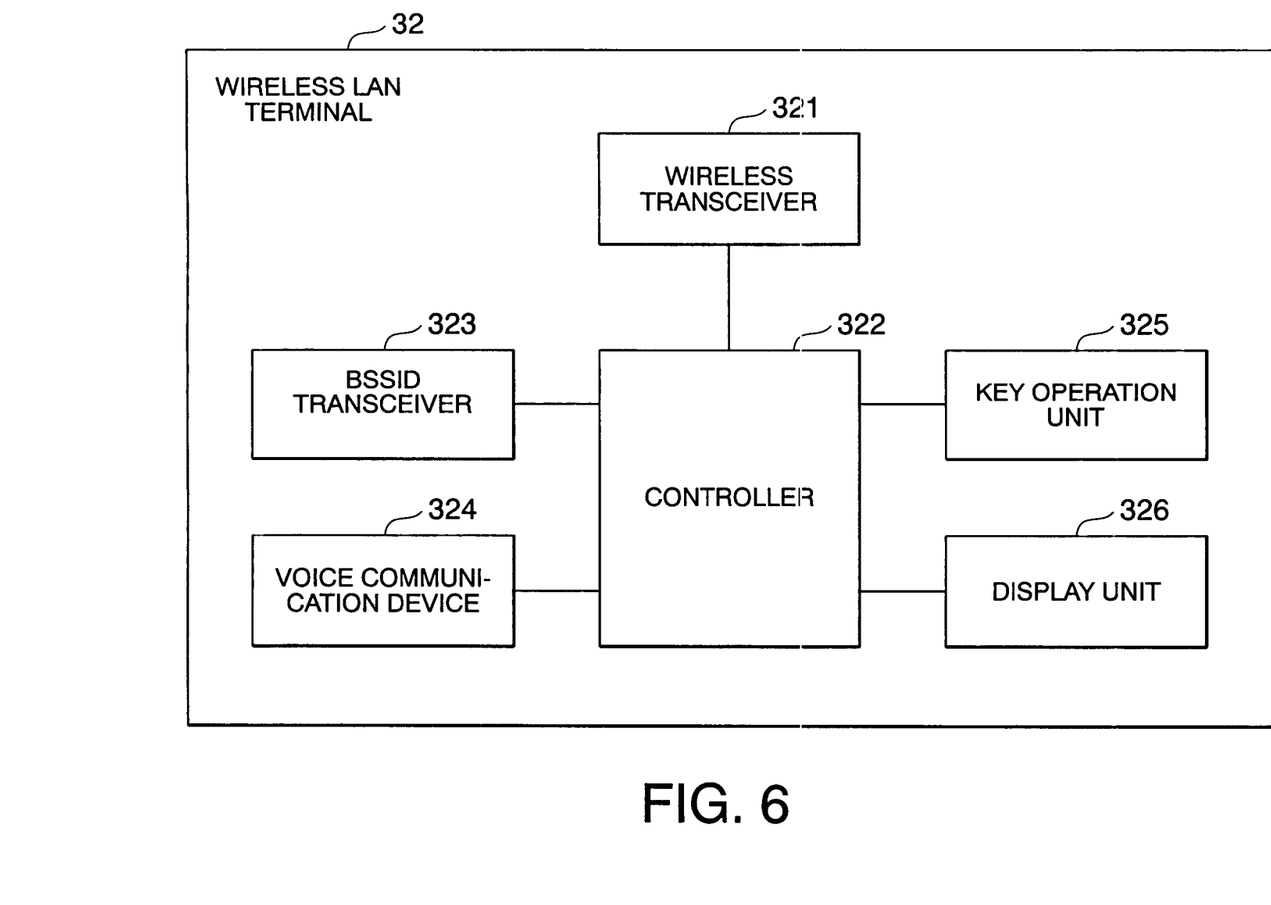
FIG. 6 is a block diagram of the configuration of the wireless LAN terminal shown in FIG. 5.

FIG. 6 is a block diagram of the configuration of the wireless LAN terminal 32 shown in FIG. 5. Referring to FIG. 6, the wireless LAN terminal 32 includes a wireless transceiver 321, a controller 322, a BSSID transceiver 323, a voice communication device 324, a key operation unit 325, and a display unit 326.

The wireless transceiver 321 wirelessly transmits/receives a signal to/from the access point 31 and the controller 322 controls the individual units and so on in the wireless LAN terminal 32. The BSSID transceiver 323 receives the BSSID from the access point 31. Further, under the control of the controller 322 (for example, during a registration operation and during an outbound/inbound call), the BSSID transceiver 323 notifies the IP-PBX 1 of the received BSSID via the access point 31.

The voice communication device 324 is used for voice communication with a caller or callee. When operated by the user, the key operation unit 325 notifies the controller 322 of the operation content. The display unit 326 displays electronic mail messages, various-operation guiding messages, and so on.

Although not shown, the wireless LAN terminal 33 has the same configuration as the above-described wireless LAN terminal 32 and thus the description thereof is not given. The wireless LAN terminals 32 and 33 are also compliant with the SIP described above and will hereinafter be referred to as "WLAN (wireless local area network) SIP-corresponding terminals."

Figure 7:
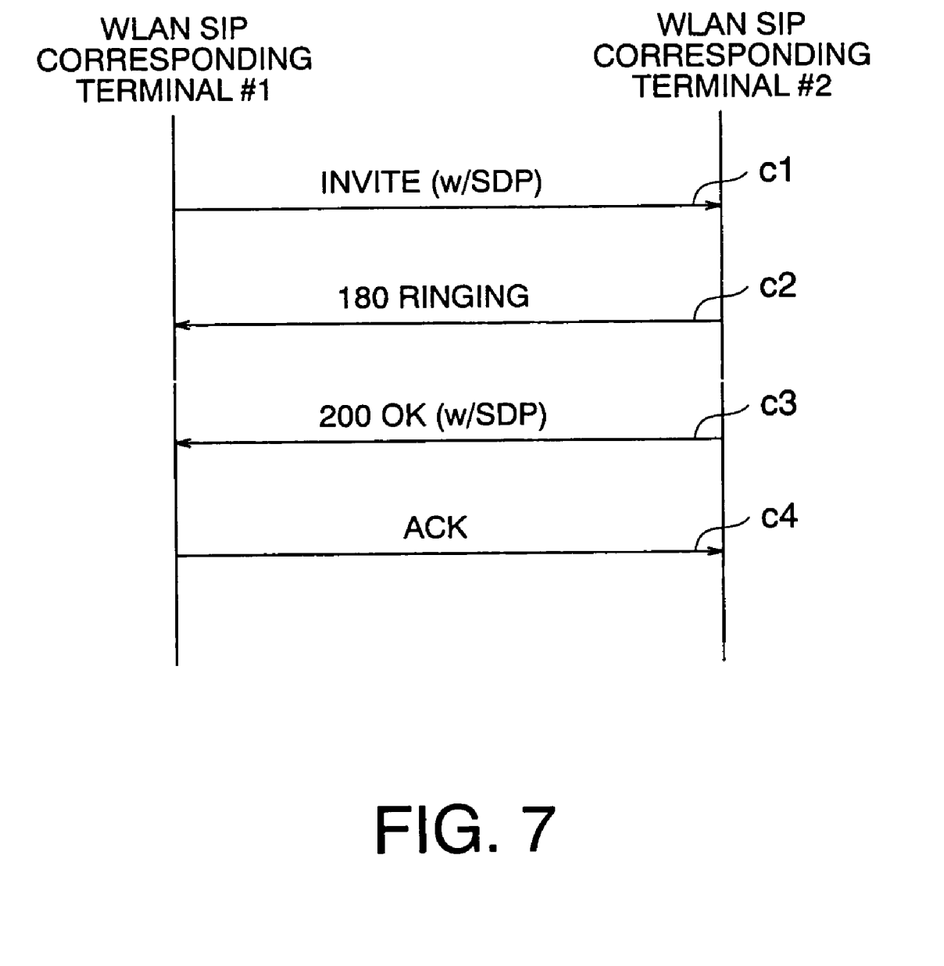
FIG. 7 is a sequence chart showing known SIP processing that does not use an IP PBX.
Figure 8:
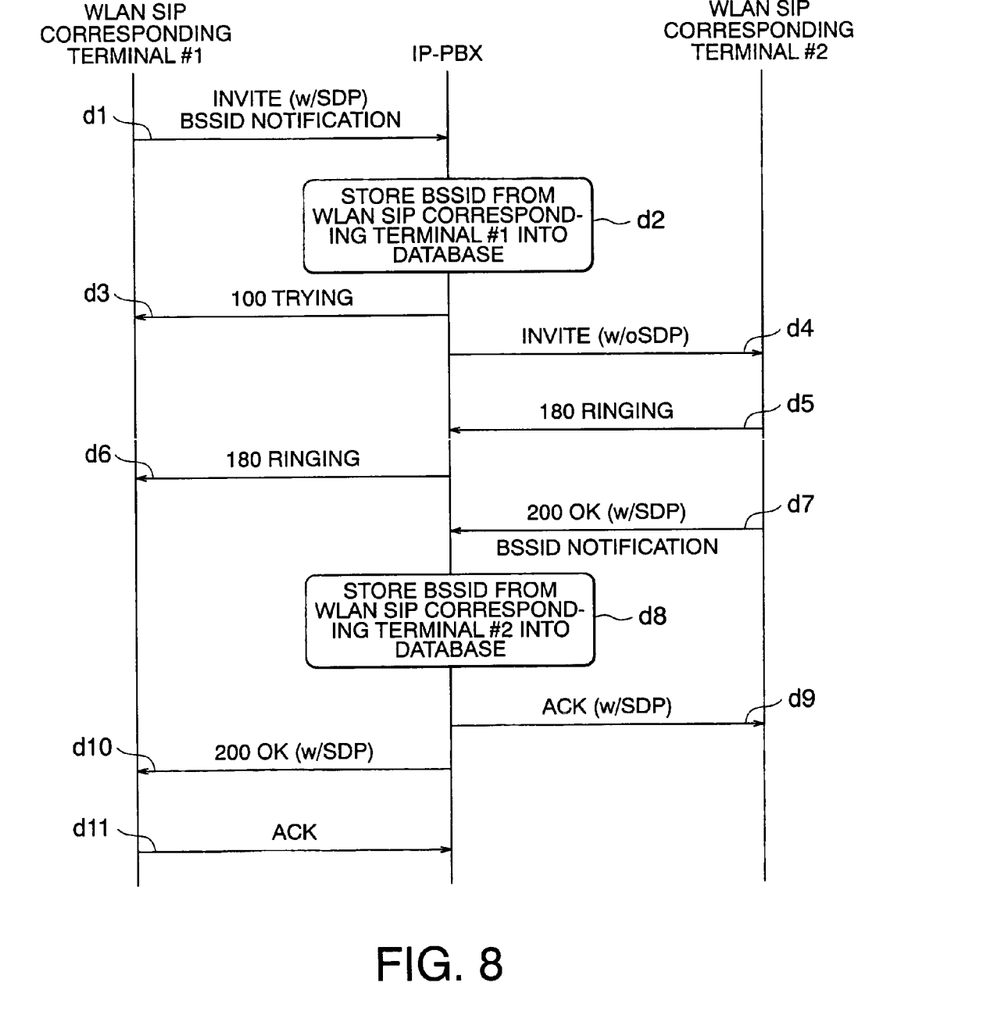
FIG. 8 is a sequence chart showing SIP processing and BSSID notification processing which use an IP PBX.

FIG. 7 is a sequence chart showing known SIP processing that does not use the IP-PBX 1. FIG. 8 is a sequence chart showing SIP processing and BSSID notification processing which use the IP-PBX 1. Now, SIP processing according to a first embodiment of the present invention will be described with reference to FIGS. 1 to 8. FIGS. 7 and 8 illustrate SIP processing between the WLAN-SIP-corresponding terminals #1 and #2.

First, the WLAN-SIP-corresponding terminal #1 sends an "INVITE (w/SDP (session descriptive protocol))" message to the WLAN-SIP-corresponding terminal #2 (at c1 in FIG. 7). In response, the WLAN-SIP-corresponding terminal #2 sends a "180 RINGING" message back to the WLAN-SIP-corresponding terminal #1 (at c2 in FIG. 7).

Subsequently, the WLAN-SIP-corresponding terminal #2 sends a "200 OK (w/SDP)" message to the WLAN-SIP-corresponding terminal #2 (at c3 in FIG. 7). In response, the WLAN-SIP-corresponding terminal #1 sends an "ACK" message to the WLAN-SIP-corresponding terminal #2 (at c4 in FIG. 7). Consequently, a call-enabled state based on an RTP (real time protocol) is established between the WLAN-SIP-corresponding terminals #1 and #2.

In contrast, in the present embodiment, the IP-PBX 1 is used to perform SIP processing between the WLAN-SIP-corresponding terminals #1 and #2 and the WLAN-SIP-corresponding terminals #1 and #2 notify the IP-PBX 1 of BSSID information.

That is, when the WLAN-SIP-corresponding terminal #1 performs SIP processing with the WLAN-SIP-corresponding terminal #2, during the transmission of an "INVITE (w/SDP)" message to the IP-PBX 1, the WLAN-SIP-corresponding terminal #1 notifies the IP-PBX 1 of BSSID information by including the information in the SIP message (at d1 in FIG. 8). The IP-PBX 1 then stores the BSSID information, of which the WLAN-SIP-corresponding terminal #1 has notified using the "INVITE (w/SDP)" message, into the database 8 (at d2 in FIG. 8).

Subsequently, the IP-PBX 1 sends a "100 Trying" message to the WLAN-SIP-corresponding terminal #1 (at d3 in FIG. 8) and sends an "INVITE (w/o SDP)" message to the WLAN-SIP-corresponding terminal #2 (at d4 in FIG. 8).

Further, in response to a "180 Ringing" message sent from the WLAN-SIP-corresponding terminal #2 (at d5 in FIG. 8), the IP-PBX 1 sends a "180 Ringing" message to the WLAN-SIP-corresponding terminal #1 (at d6 in FIG. 8).

Meanwhile, after sending the above-noted "180 Ringing" message (at d5 in FIG. 8), the WLAN-SIP-corresponding terminal #2 sends a "200OK (w/SDP)" message to the IP-PBX 1 (at d7 in FIG. 8). During this transmission, the WLAN-SIP-corresponding terminal #2 notifies the IP-PBX 1 of BSSID information by including the information in the SIP message. The IP-PBX 1 then stores the BSSID information, of which the WLAN-SIP-corresponding terminal #2 has notified using the "200 OK (w/SDP)" message, into the database 8 (at d8 in FIG. 8). The BSSID information can also be included, for the transmission, in an SIP message other than the above-noted SIP message.

Subsequently, the IP-PBX 1 returns an "ACK (w/SDP)" message to the WLAN-SIP-corresponding terminal #2 (at d9 in FIG. 8) and sends a "200 OK (w/SDP)" message to the WLAN-SIP-corresponding terminal #1 (at d10 in FIG. 8). The WLAN-SIP-corresponding terminal #1 returns an "ACK" message to the IP-PBX 1 (at d1 in FIG. 8).

Here, the "INVITE" is a method used to establish a session between participants, the "100 TRYING" represents an attempt in progress, the "180 RINGING" represents a successful response, and the "ACK" is a method used for permitting session establishment.

In the above-described processing, the processing in the IP-PBX 1 is performed by a control module (not shown) corresponding to the WLAN-SIP-corresponding terminals #1 and #2. For example, the processing performed by the control module is analogous to the processing performed by the expanded sip protocol control module 18, which corresponds to the above-described expanded sip protocol corresponding terminal 6.

With the arrangement described above, in the present embodiment, the IP-PBX 1 allows the protocol modules to provide interconnection between the SIP-compatible LAN terminals 32 and 33 and other extensions connected to the IP-PBX 1. Further, this arrangement can offer a wide range of additional services of the IP-PBX 1 to the wireless LAN terminals 32 and 33.

Typically, the access point 31 included in the wireless LAN 200 in the network notifies the wireless LAN terminals 32 and 33, which belong to the access point 33, of the BSSID information, and the wireless LAN terminals 32 and 33 can recognize the connectable access point 31 by detecting the BSSID.

In the present embodiment, the wireless LAN terminals 32 and 33 each have a function (provided by the BSSID transceiver 323) for notifying the IP-PBX 1 of the BSSID received from the access point 31. This function is not available with known SIP terminals.

Each of the wireless LAN terminals 32 and 33 notifies of the BSSID information, for registration in the IP-PBX 1 and/or for making/receiving a call. The IP-PBX 1 then stores the notified BSSID into the database 8 of the IP-PBX 1, for each of the wireless LAN terminals 32 and 33.

Since the wireless LAN terminals 32 and 33 can freely move in the wireless LAN 200, the access point to which the terminals 32 and 33 belong changes due to the movement. At a location to which the terminals 32 and 33 move, when they perform a registration operation or an outbound/inbound call operation, the wireless LAN terminals 32 and 33 notify the IP-PBX 1 of BSSID information that is different from the BSSID information stored in the database 8. Thus, the IP-PBX 1 updates contents in the database 8 which correspond to the wireless LAN terminals 32 and 33.

In the present embodiment, the use of BSSID information stored in the database 8 of the IP-PBX 1 can provide a service in which a user's location is necessary, for example, an emergency telephone service in which making a call to a specific number is possible in an emergency to inform of the state of the emergency.

Additionally, the present embodiment may be applied to a wireless LAN terminal that does not have a function for notifying of a BSSID. In such a case, by using the access point 31 that covers the wireless LAN terminal and that can work with the IP-PBX 1, the wireless LAN terminal can notify the IP-PBX 1 about information of the wireless LAN terminal and the BSSID of the access point 31. This arrangement, therefore, can provide a service in which location information is necessary, such as an emergency telephone service.

Figure 9:
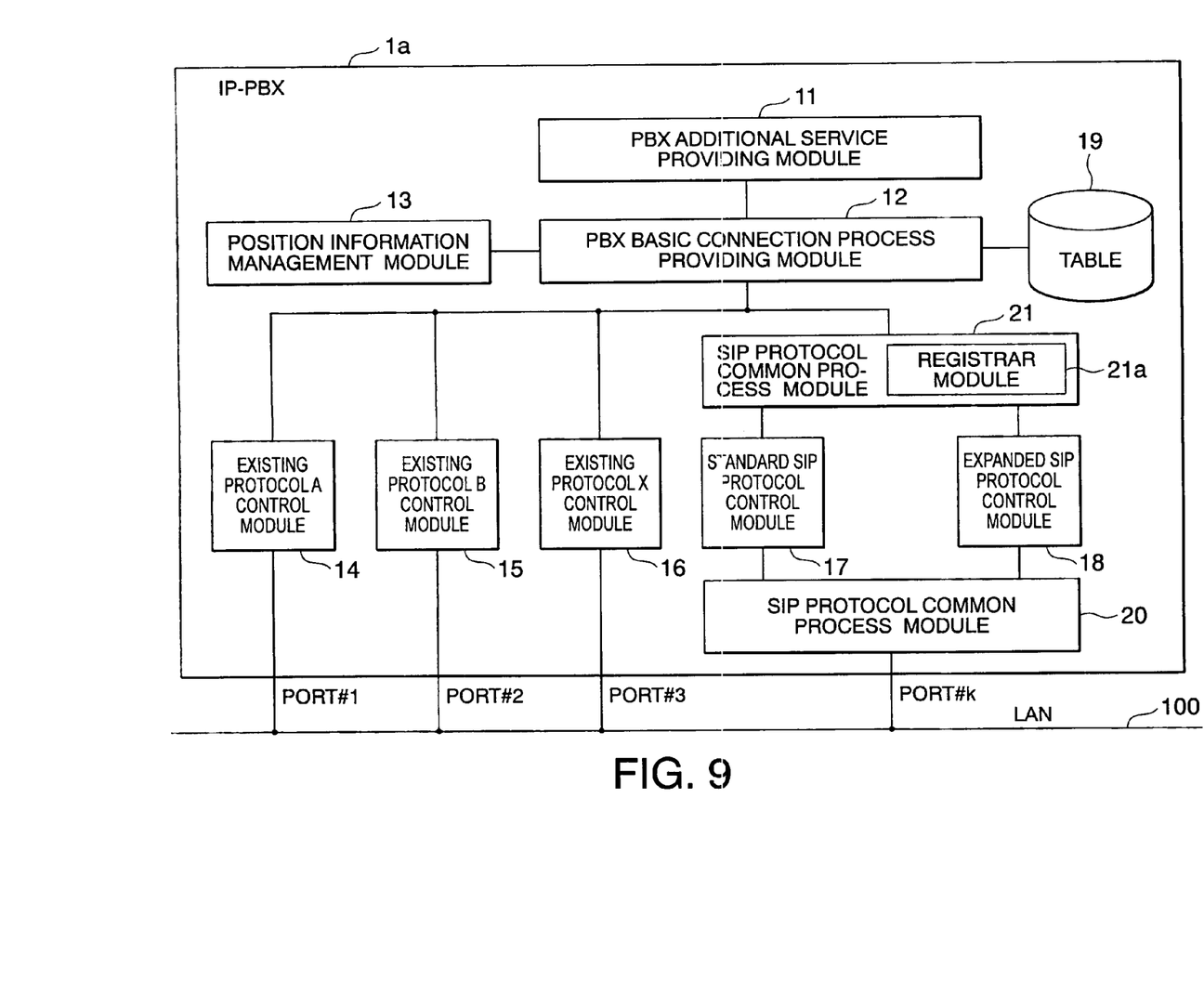
FIG. 9 is a block diagram of the configuration of an IP PBX according to a second embodiment of the present invention.

As described above, according to the present embodiment, SIP-compliant client terminals can be covered by services of the IP-PBX 1. Further, this arrangement allows an SIP client terminal to achieve flexible interconnection with terminals compliant with various protocols supported by the IP-PBX 1, and also can offer a wide range of additional services of the IP-PIX 1 to the SIP client terminal, FIG. 9 is a block diagram of the configuration of an IP PBX according to a second embodiment of the present invention. Referring to FIG. 9, an IP-PBX 1a according to the second embodiment of the present invention has the same configuration as the IP-PBX 1 according to the first embodiment, but includes Sip protocol common-processing modules 20 and 21, The Sip protocol common-processing modules 20 and 21 are obtained by modularizing common processing of the standard-SIP protocol control module 17 and the expanded sip protocol control module 18. In FIG. 9, the same elements as those shown in FIG. 2 are denoted with the same reference numerals.

Processing of the standard-SIP protocol control module 16, the expanded sip protocol a control module 17, and the expanded sip protocol b control module 18 are modularized except for common processing. Examples of the common processing include contact-information registration processing, which is implemented by an Sip protocol registrar modules 21a.

In the present embodiment, the Sip protocol common-processing modules 20 and 21 are provided at the LAN 100 side and the PBX basic-connection-processing providing module 12 side, respectively, relative to the standard SIP protocol control module 17 and the expanded sip protocol control module 18. Those modules, however, can also be implemented by a single module.

Although the ports #4 and #5 are assigned to the standard-SIP protocol control module 17 and the expanded sip protocol control module 18 in the above-described first embodiment of the present embodiment, a common port #k is assigned to the Sip protocol common-processing module 20 in the present embodiment.

In the present embodiment, the use of BSSID information stored in the database 8 of the IP-PBX 1a can provide a service in which a user's location is necessary, for example, an emergency telephone service in which making a call to a specific number is possible in an emergency to inform of the state of the emergency.

Additionally, the present embodiment may also be applied to a wireless LAN terminal that does not have a function for notifying of a BSSID. In such a case, by using the access point 31 that covers the wireless LAN terminal and that can work with the IP-PBX 1a, the wireless LAN terminal can notify the IP-PBX 1a about information of the wireless LAN terminal and the BSSID of the access point 31. This arrangement, therefore, can provide a service in which location information is required, such as an emergency telephone service.

As described above, according to the present embodiment, SIP-compliant client terminals can be covered by services of the IP-PBX 1a. Further, this arrangement allows an SIP client terminal to achieve flexible interconnection with terminals compliant with various protocols supported by the IP-PBX 1a, and also can offer a wide range of additional services of the IP-PBX 1a to the SIP client terminal.

As described above, the present invention is not only applicable to a case in which a private branch exchange offers services to SIP terminals in a network such as a LAN, but is also applicable to a call connection processing through an external IP network, such as the Internet. The present invention is also applicable to an IP centrex service that provides a PBX function through an IP network.

What is claimed is:

1. A network comprising:
   at least one session initiation protocol (SIP) terminal for performing communication based on a session initiation protocol that implements connection-oriented communication in which communication is performed upon confirmation of a connection with another terminal in an internet protocol (IP) network;
   a private branch exchange for performing call connection processing between terminals;
   a database; and
   a wireless local area network including
      an access point that is connected to the private branch exchange through a transmission path, and
      at least one wireless local-area-network terminal that belongs to the access point and notifies of unique identifier information of the access point;
   wherein the private branch exchange comprises at least one session-initiation-protocol protocol control module, obtained by modularizing processing of the session initiation protocol through use of a scheme of a back-to-back user agent (B2BUA) that acts as a proxy user agent and incorporated as one component; and a location-information management module, incorporated as one component, for managing the unique identifier information of which the wireless local-area-network terminal notifies,
   wherein the unique identifier information of the access point comprises a basic service set identifier (BSSID), and
   wherein the location-information management module collects the unique identifier information that comprises the BSSID, and records the unique identifier information in the database.

2. The network according to claim 1, wherein the session initiation protocol is a communication protocol used to start and end multimedia communication through use of data in an internet packet format.

3. The network according to claim 1, wherein the session-initiation-protocol protocol control modules are provided so as to correspond to the respective session-initiation-protocol terminals having different protocols from each other.

4. The network according to claim 1, wherein the private branch exchange provides protocol modules with at least one of interconnection and an additional service.

5. The network according to claim 1, wherein each wireless local-area-network terminal is compliant with the session initiation protocol.

6. The network according to clam 1, wherein the wireless area network further comprises:
   a PBX additional services providing module that provides additional services for the SIP terminal, the additional services including at least one of a call back service, an extension interruption service, and a third party control service.

7. The network according to clam 1, wherein the BSSID corresponds to a media access control (MAC) address of the access point, which is different for each of a plurality of access points that are connected to said private branch exchange.

8. A private branch exchange for performing call connection processing between terminals, the private branch exchange comprising:
   at least one session-initiation-protocol (SIP) protocol control module, obtained by modularizing processing of a session initiation protocol through use of a scheme of a back-to-back user agent (B2BUA) that acts as a proxy user agent, the session initiation protocol implementing connection-oriented communication in which communication is performed upon confirmation of a connection with another terminal in an internet protocol (IP) network;
   a database; and
   a location-information management module, incorporated as one component, for managing unique identifier information of an access point included in a wireless local area network and connected to the private branch exchange through a transmission path, the wireless local area network including at least one wireless local-area-network terminal that belongs to the access point and that notifies of the unique identifier information,
   wherein the unique identifier information of the access point comprises a basic service set identifier (BSSID), and
   wherein the location-information management module collects the unique identifier information that comprises the BSSID, and records the unique identifier information in the database.

9. The private branch exchange according to claim 8, wherein the session initiation protocol is a communication protocol used to start and end multimedia communication through use of data in an internet packet format.

10. The private branch exchange according to claim 8, wherein the session-initiation-protocol protocol control modules are provided so as to correspond to respective session-initiation-protocol terminals having different protocols from each other.

11. The private branch exchange according to claim 8, wherein the private branch exchange provides protocol modules with at least one of interconnection and an additional service.

12. The private branch exchange according to claim 8, wherein each wireless local-area-network terminal is compliant with the session initiation protocol.

13. The private branch exchange according to clam 8, further comprising:
   a PBX additional services providing module that provides additional services for the SIP terminal, the additional services including at least one of a call back service, an extension interruption service, and a third party control service.

14. A wireless local-area-network terminal included in a wireless local area network having an access point to which the wireless local-area-network terminal belongs, the wireless local area network being provided in a network that includes, at least, a database, and a private branch exchange for performing call connection processing between terminals and at least one session-initiation-protocol (SIP) terminal for performing communication based on a session initiation protocol that implements connection-oriented communication in which communication is performed upon confirmation of a connection with another terminal in an internet protocol (IP) network, the access point being connected to the private branch exchange through a transmission path, wherein the private branch exchange comprises a location-information management module, incorporated as one component, for managing unique identifier information of the access point, and at lease one session-initiation-protocol control module obtained by modularizing processing of the session initiation protocol through use of a scheme of a back-to-back user agent (B2BUA) that acts as a proxy user agent and incorporated as one component, the wireless local-area-network terminal comprising:
   notifying means for notifying the location-information management module of the unique identifier information of the access point via the session-initiation-protocol control module,
   wherein the unique identifier information of the access point comprises a basic service set identifier (BSSID), and
   wherein the location-information management module collects the unique identifier information that comprises the BSSID, and records the unique identifier information in the database.

15. The wireless local-area-network terminal according to claim 14, wherein the session initiation protocol is a communication protocol used to start and end multimedia communication through use of data in an internet packet format.

16. The wireless local-area-network terminal according to claim 14, wherein the wireless local-area-network terminal is compliant with the session initiation protocol.

17. The wireless local-area-network terminal according to claim 14, further comprising:
   a PBX additional services providing module that provides additional services for the SIP terminal, the additional services including at least one of a call back service, an extension interruption service, and a third party control service.

18. A method for controlling at least one multiprotocol communication terminal in a network that includes at least a database and one session initiation protocol (SIP) terminal for performing communication based on a session initiation protocol that implements connection-oriented communication in which communication is performed upon confirmation of a connection with another terminal in an internet protocol (IP) network, a private branch exchange for performing call connection processing between terminals, and a wireless local area network including an access point that is connected to the private branch exchange through a transmission path and at least one wireless local-area-network terminal that belongs to the access point and notifies of unique identifier information of the access point; the method comprising the steps of:
   causing at least one session-initiation-protocol protocol control module to perform processing of the session initiation protocol, the session-initiation-protocol protocol control module being obtained by modularization through use of a scheme of a back-to-back user agent (B2BUA) that acts as a proxy user agent and being incorporated as one component of the private branch exchange; and
   causing a location-information management module to manage the unique identifier information of which the wireless local-area-network terminal notifies, the location-information management module being incorporated as one component of the private branch exchange,
   wherein the unique identifier information of the access point comprises a basic service set identifier (BSSID), and
   wherein the location-information management module collects the unique identifier information that comprises the BSSID, and records the unique identifier information in the database.

19. The method according to claim 18, wherein the session initiation protocol is a communication protocol used to start and end multimedia communication through use of data in an internet packet format.

20. The method according to claim 18, wherein the session-initiation-protocol protocol control modules are provided so as to correspond to the respective session-initiation-protocol terminals having different protocols from each other.

21. The method according to claim 18, wherein the private branch exchange provides protocol modules with at least one of interconnection and an additional service.

22. The method according to claim 18, wherein each wireless local-area-network terminal is compliant with the session initiation protocol.

23. The method according to clam 18, further comprising:
   providing, by way of a PBX additional services providing module, additional services for the SIP terminal, the additional services including at least one of a call back service, an extension interruption service, and a third party control service.

24. The method according to clam 18, wherein the BSSID corresponds to a media access control (MAC) address of the access point, which is different for each of a plurality of access points that are connected to said private branch exchange.

\* \* \* \* \*

UNITED STATES PATENT AND TRADEMARK OFFICE
CERTIFICATE OF CORRECTION

| | |
|---|---|
| PATENT NO. | : 7,408,910 B2 |
| APPLICATION NO. | : 10/968152 |
| DATED | : August 5, 2008 |
| INVENTOR(S) | : Shinobu Kimata et al. |

It is certified that error appears in the above-identified patent and that said Letters Patent is hereby corrected as shown below:

On the front of the Patent:

Under (73) Assignee, please replace:

NEC Corporation, Tokyo (JP)

With

NEC Infrontia Corporation, Kanagawa (JP)

Signed and Sealed this
Twenty-eighth Day of June, 2011

David J. Kappos
*Director of the United States Patent and Trademark Office*